United States Patent
Satran et al.

(10) Patent No.: US 8,262,323 B2
(45) Date of Patent: Sep. 11, 2012

(54) CUTTING TOOL AND CLAMPING MECHANISM THEREFOR

(75) Inventors: Amir Satran, Kfar Vradim (IL); Evgeny Tulchinsky, Kiryat Yam (IL); Alexander Koifman, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 409 days.

(21) Appl. No.: 12/613,137

(22) Filed: Nov. 5, 2009

(65) Prior Publication Data

US 2010/0135735 A1 Jun. 3, 2010

(30) Foreign Application Priority Data

Nov. 30, 2008 (IL) .......................... 195601

(51) Int. Cl.
B27G 13/00 (2006.01)
B27G 13/04 (2006.01)
(52) U.S. Cl. ............................ 407/41; 407/93
(58) Field of Classification Search .............. 407/41, 407/49, 94, 93, 106, 107, 108
See application file for complete search history.

(56) References Cited

U.S. PATENT DOCUMENTS

| | | | |
|---|---|---|---|
| 3,279,035 A | 10/1966 | Johnson | |
| 3,791,429 A * | 2/1974 | Morris | 144/218 |
| 5,209,278 A * | 5/1993 | Carpenter et al. | 144/230 |
| 5,352,067 A | 10/1994 | Arai et al. | |
| 5,558,142 A * | 9/1996 | Ehrle et al. | 144/230 |
| 5,857,506 A * | 1/1999 | Paolone | 144/230 |
| 6,290,436 B1 | 9/2001 | Qvarth | |
| 6,739,808 B1 | 5/2004 | Ghosh | |
| 2009/0238650 A1 | 9/2009 | Jansson | |

FOREIGN PATENT DOCUMENTS

| | | |
|---|---|---|
| IL | 155288 | 9/2007 |
| WO | 95/05913 | 3/1995 |
| WO | WO 2008/050318 | 5/2008 |

OTHER PUBLICATIONS

Official action dated Nov. 29, 2011 issued in corresponding Israeli Application (No. IL195601).
International Search Report in PCT/IL2009/001045, dated Mar. 24, 2010.

* cited by examiner

Primary Examiner — Will Fridie, Jr.
(74) Attorney, Agent, or Firm — Womble Carlyle

(57) ABSTRACT

A clamping mechanism clamps a cutting insert in a tool body. The clamping mechanism has a clamping arm seated within a clamping arm pocket. The clamping arm includes a clamping protrusion extending rearwardly from a rear surface of the clamping arm. The cutting insert has a bore having an insert retaining surface and is seated within an insert pocket. Upon tightening the clamping arm into the tool body, the clamping protrusion presses against the insert retaining surface and the cutting insert is securely abutted within the insert pocket.

22 Claims, 10 Drawing Sheets

CUTTING TOOL AND CLAMPING MECHANISM THEREFOR

FIELD OF THE INVENTION

The present invention relates to a clamping mechanism of a cutting tool for clamping a cutting insert into a tool body.

BACKGROUND OF THE INVENTION

Milling cutters, in particular face milling cutters, generally comprise a plurality of cutting inserts that are arranged around a periphery of a tool body. Each of the cutting inserts is retained within an insert pocket by suitable retaining means. Typically, the cutting insert is retained by a clamping screw that passes through a through bore of the cutting insert and threadingly engages a threaded bore within the insert pocket.

In order to increase the efficiency and the cost effectiveness of the cutting tool, it is desired to mount as many cutting inserts as possible for a given tool diameter. For that purpose, it is a need to decrease the space between two consecutive cutting inserts.

When the cutting inserts are radially mounted with respect to the axis of rotation of the cutting tool, the space required for the clamping screws is relatively large. On the one hand, the thickness of the tool body behind each cutting insert should be sufficient for locating therein the threaded bore. On the other hand, there should be left considerable space in front of every cutting insert for enabling easy insertion of the clamping screw into the through bore of the cutting insert and for enabling a screwdriver to freely engage the head of the clamping screw without being obstructed by the tool body.

In view of the above, when it is desired to have an extra-fine pitch milling cutter, it is preferable to retain the cutting inserts by means of a wedge-type lock. In such type of locks, the clamping screw is generally radially directed and, therefore, occupies minimal space at the periphery of the milling cutter.

There are several types of wedge lock milling cutters known in the art. In some cases, the clamping screw passes through a through bore in the wedge. In other cases, the clamping screw presses sideways on the wedge. In these types of clamping mechanisms, the cutting insert is retained in its pocket by means of a wedging force acting thereon by the wedge that is tightened by the clamping screw.

These types of clamping mechanisms suffer from a disadvantage that the cutting insert is retained to its pocket solely by a pressure applied thereon by the wedge. In case of a slight untightening of the clamping screw as a result of vibration or negligence, and, with the addition of the outwardly radially directed centrifugal forces acting on the cutting insert as a result of the rotation of the cutting tool, the cutting insert may lose the contact with its pocket walls and fly out during a machining operation.

SUMMARY OF THE INVENTION

In accordance with the present invention there is provided a clamping mechanism for clamping a cutting insert in a tool body. The clamping mechanism comprises:

a clamping arm seated within a clamping arm pocket, the clamping arm comprising a clamping protrusion extending rearwardly from a rear surface of the clamping arm; and the cutting insert comprising a bore having an insert retaining surface and being seated within an insert pocket; wherein:

the clamping protrusion is configured to press against the insert retaining surface to securely retain the cutting insert within the insert pocket, upon tightening the clamping arm into the tool body.

Advantageously, upon tightening the clamping arm into the tool body, the clamping arm moves in a combined rotational and translational movement.

Typically, the tool body comprises a pocket threaded bore extending inwardly to the tool body, the pocket threaded bore having a pocket thread directed in a first direction;

the clamping arm comprises a clamp upper surface and a clamp lower surface extending between two clamp side walls, a threaded through bore extending from the clamp upper surface to the clamp lower surface, the threaded through bore having a through bore thread directed in a second direction, the second direction being opposite to the first direction;

a clamping screw having a screw upper threaded portion, a screw lower threaded portion and an unthreaded screw neck portion therebetween, the screw lower threaded portion having a thread directed in the first direction and is threadingly engaged with the pocket threaded bore of the tool body, the screw upper threaded portion having a thread directed in the second direction and threadingly engaged with the threaded through bore of the clamping arm; and upon turning the clamping screw in the first direction, the clamping arm is pulled into the clamping arm pocket towards the pocket threaded bore, and the clamping protrusion of the clamping arm presses against the insert retaining surface thus securely abutting the cutting insert within the insert pocket.

Advantageously, the clamping arm comprises in a front portion thereof a clamp front surface that extends between the clamp upper surface, the clamp lower surface and the two clamp side walls, the clamp front surface comprises a clamp front wall that merges with the clamp upper surface through a forwardly extending sliding protrusion, the sliding protrusion comprises a sliding concave surface in a front lower portion thereof, the sliding concave surface having a first radius of curvature and smoothly merging with the clamp front wall;

the clamping arm pocket has two pocket side walls extending rearwardly from a pocket front wall, an upper end of the pocket front wall comprises a sliding convex surface that is directed upwardly and rearwardly and having a second radius of curvature;

upon turning the clamping screw in the first direction and creating a first contact between the sliding concave surface of the clamping arm and the sliding convex surface of the clamping arm pocket, the clamping arm moves in a combined rotational and translational movement.

If desired, the second radius of curvature is smaller than the first radius of curvature.

In some embodiments, the rotational movement comprises rotation of the clamping arm around the sliding convex surface of the clamping arm pocket in a clamping arm rotational direction; and the translational movement comprises translation of the clamping arm towards the pocket threaded bore.

Typically, the bore of the cutting insert is a through bore.

Practically, the clamp side walls are planar, parallel to each other and have a first distance therebetween;

the pocket side walls are planar, parallel to each other and having a second distance therebetween; and the first distance is slightly smaller than the second distance.

If desired, the clamping protrusion comprises a cylindrical portion merging with a clamp rear wall and a slanted portion extending rearwardly from the cylindrical portion.

In some embodiments, the slanted portion is conical.

If desired, the rear surface of the clamping arm is provided with a transversely extending recess in a lower portion thereof.

Further if desired, the sliding convex surface ends, in a transverse end thereof, with a tool body widening.

Advantageously, the clamp upper surface is concave in a side view of the clamping arm.

Further advantageously, a rear end of the clamp upper surface is convex in a front to rear direction of the clamping arm.

Still further advantageously, in a clamped position of the cutting insert, the rear end of the clamp upper surface covers the bore of the cutting insert.

If desired, the rear end of the clamp upper surface is distanced a sixth distance from a tangential abutment surface of the cutting insert.

Typically, the clamping screw comprises a key slot in an end portion thereof.

In another aspect, the invention is directed to a cutting tool having a novel clamping mechanism.

In still another aspect, the invention is directed to a cutting tool assembly adjustable between an unassembled state and an assembled state.

BRIEF DESCRIPTION OF THE DRAWINGS

For a better understanding of the present invention and to show how the same may be carried out in practice, reference will now be made to the accompanying drawings, in which.

DETAILED DESCRIPTION OF THE INVENTION

Figure 1:
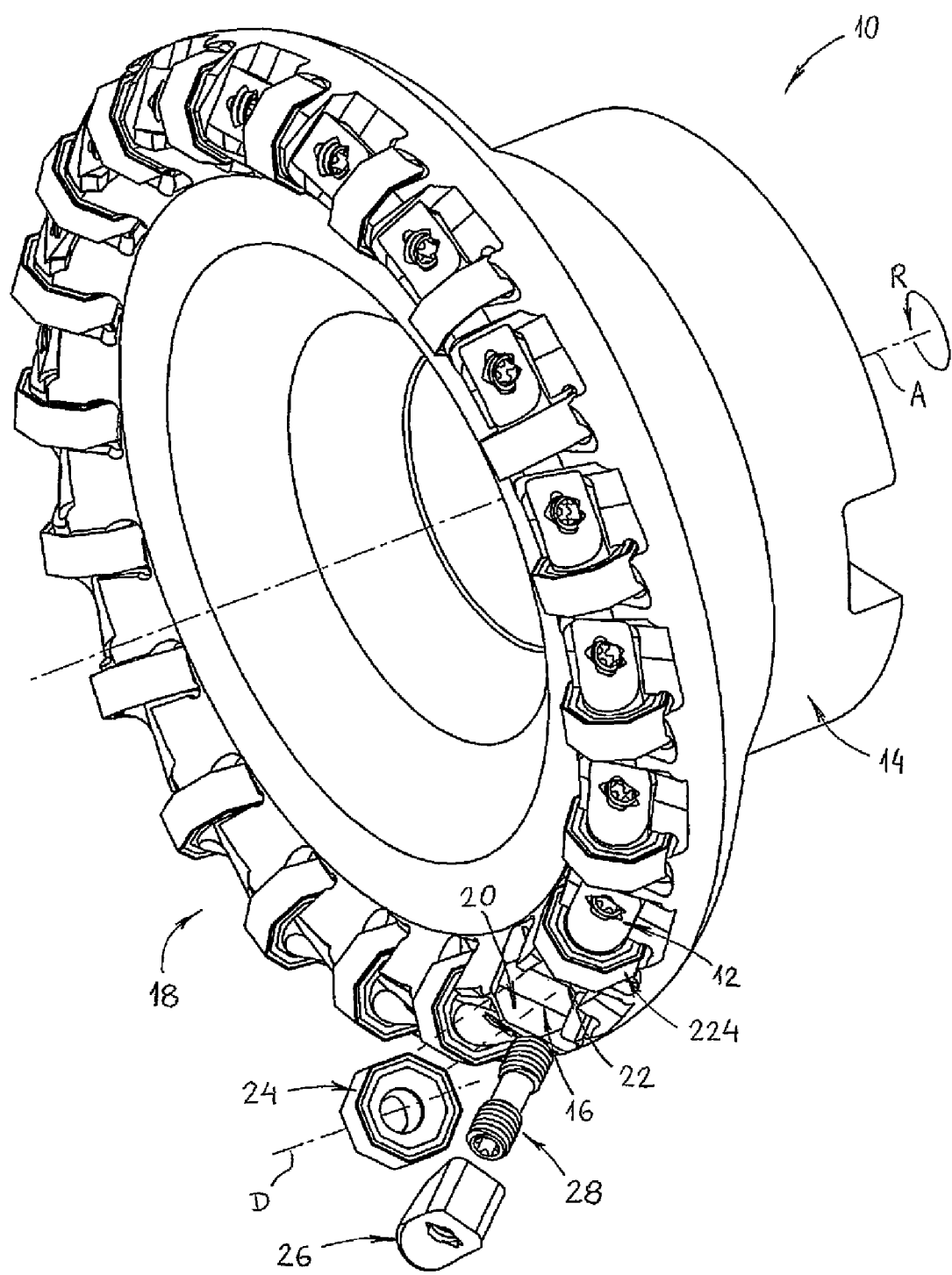
FIG. 1 is a perspective view of a cutting tool utilizing a clamping mechanism in accordance with the present invention.
Figure 2:
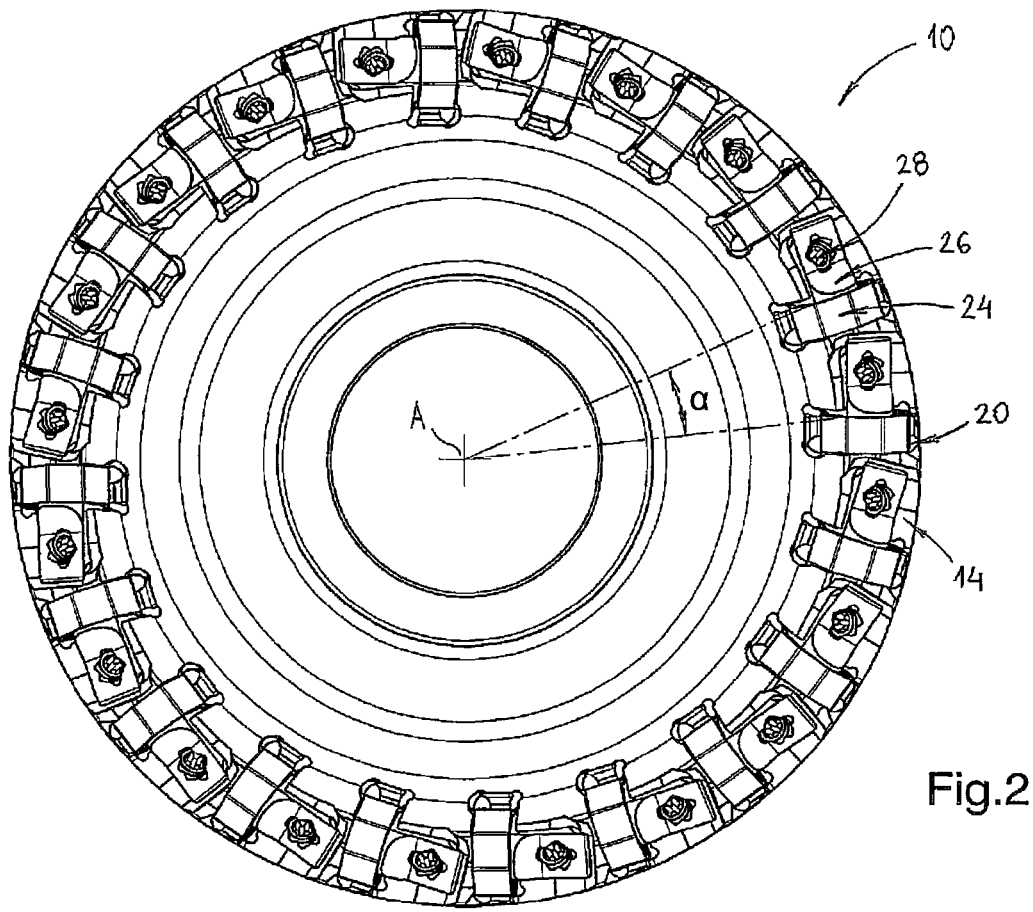
FIG. 2 is a bottom view of the cutting tool of FIG. 1.
Figure 3:
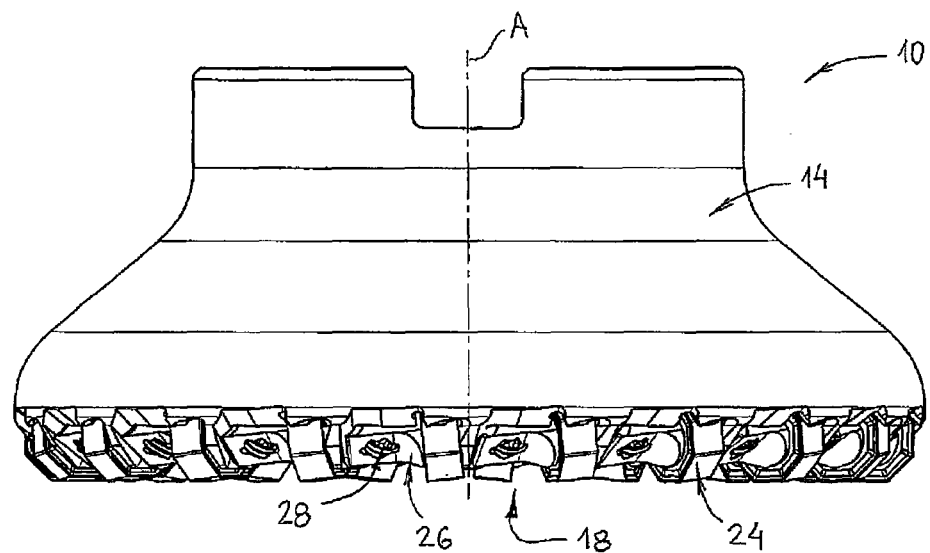
FIG. 3 is a side view of the cutting tool of FIG. 1.
Figure 4:
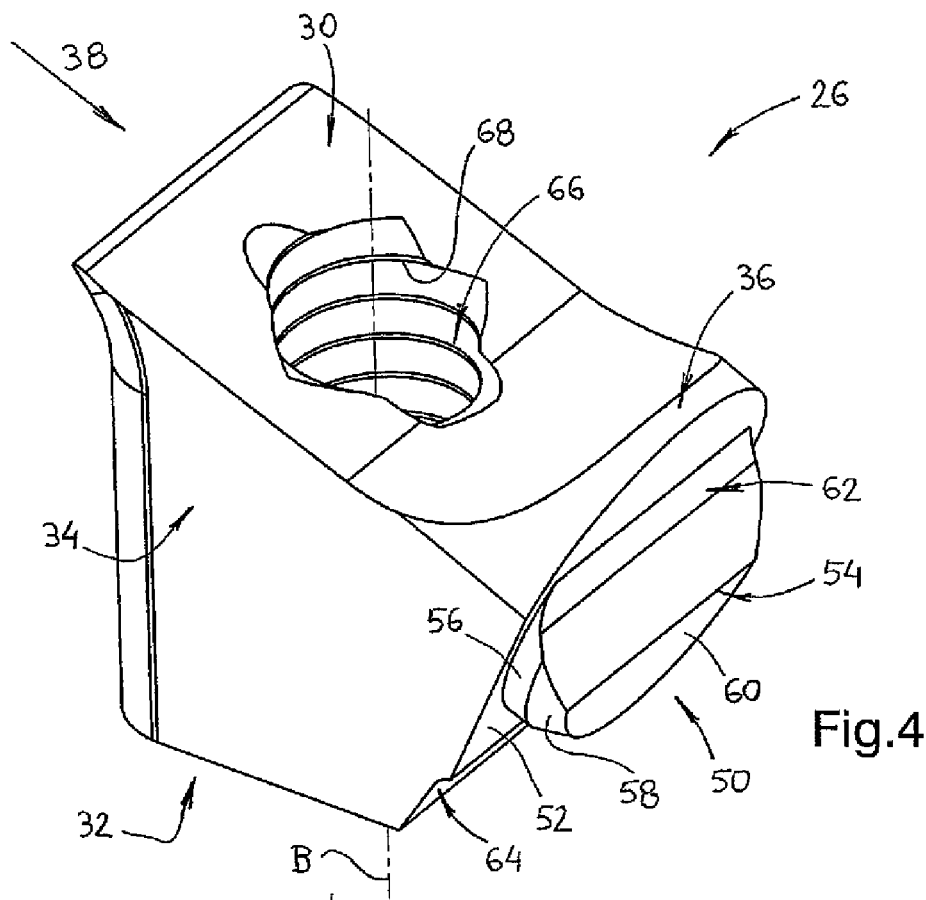
FIG. 4 is a top rear perspective view of the clamping arm of FIG. 1.
Figure 5:
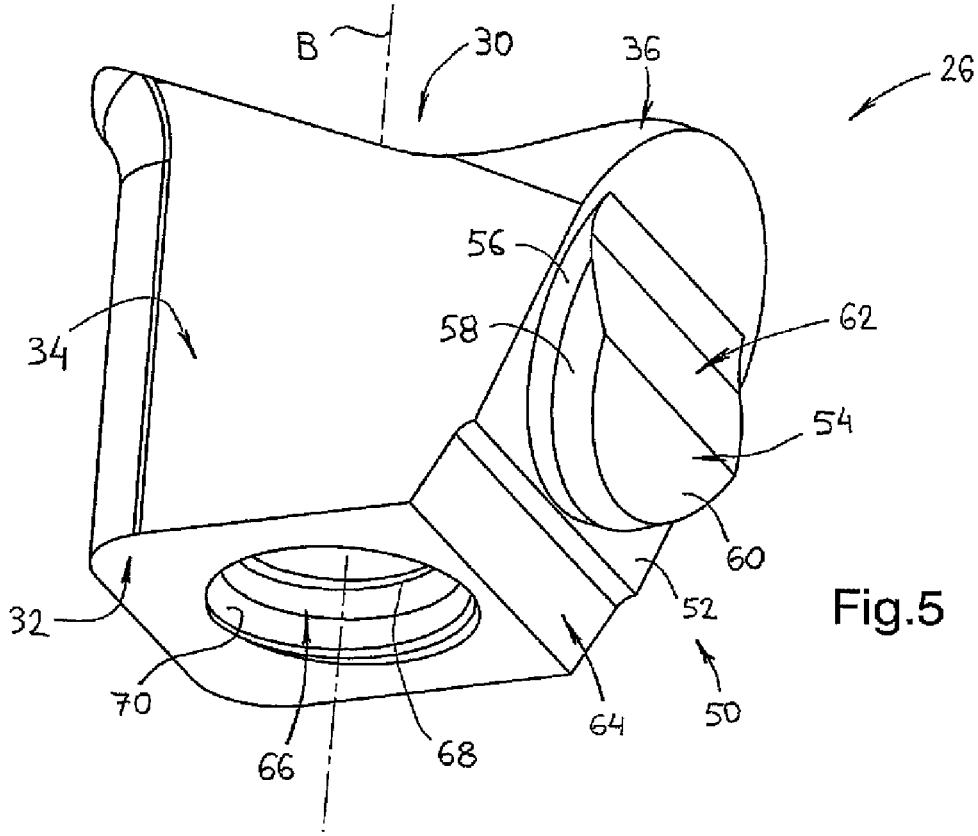
FIG. 5 is a bottom rear perspective view of the clamping arm of FIG. 1.
Figure 6:
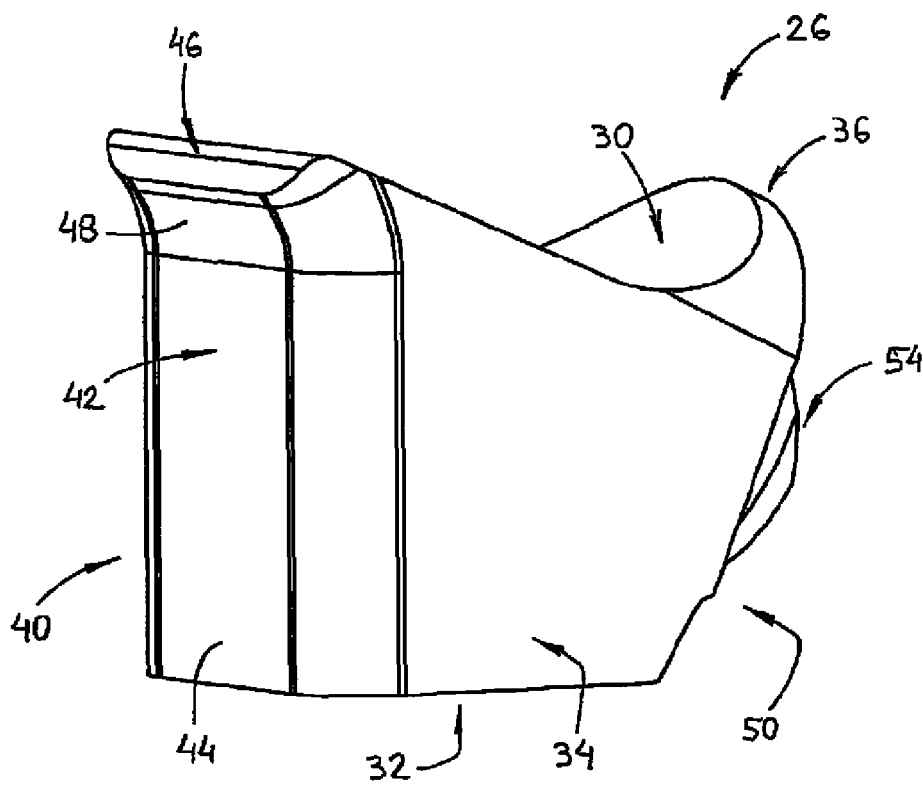
FIG. 6 is a top front perspective view of the clamping arm of FIG. 1.

Attention is first drawn to FIGS. 1 to 3 showing a cutting tool 10 utilizing a clamping mechanism 12 in accordance with the present invention. The clamping mechanism 12 is shown when used in a face milling cutter. However, the present invention is not limited for being used in face milling cutters only and other types of milling cutters and cutting tools may use the clamping mechanism 12 according to the present invention as well.

It should be noted that directional terms appearing throughout the specification and claims, e.g. "forward", "rear", "upper", "lower" etc., are used as terms of convenience to distinguish the location of various surfaces relative to each other. These terms are defined with reference to the figures, however, they are used for illustrative purposes only, and are not intended to limit the scope of the appended claims.

The cutting tool 10 has a longitudinal axis of rotation A defining a front-to-rear direction of the cutting tool 10 and a direction of rotation R. The cutting tool 10 comprises a tool body 14 having a plurality of tool pockets 16 formed in a front end 18 of the tool body 14. Each of the tool pockets 16 comprises an insert pocket 20 and a clamping arm pocket 22. A cutting insert 24 is retained in each of the insert pockets 20 by means of a clamping arm 26. The clamping arm 26 is retained in the clamping arm pocket 22 by means of a clamping screw 28. The cutting insert 24 may be preferably made from cemented carbide powders by pressing and sintering or by injection molding techniques.

Figure 14:
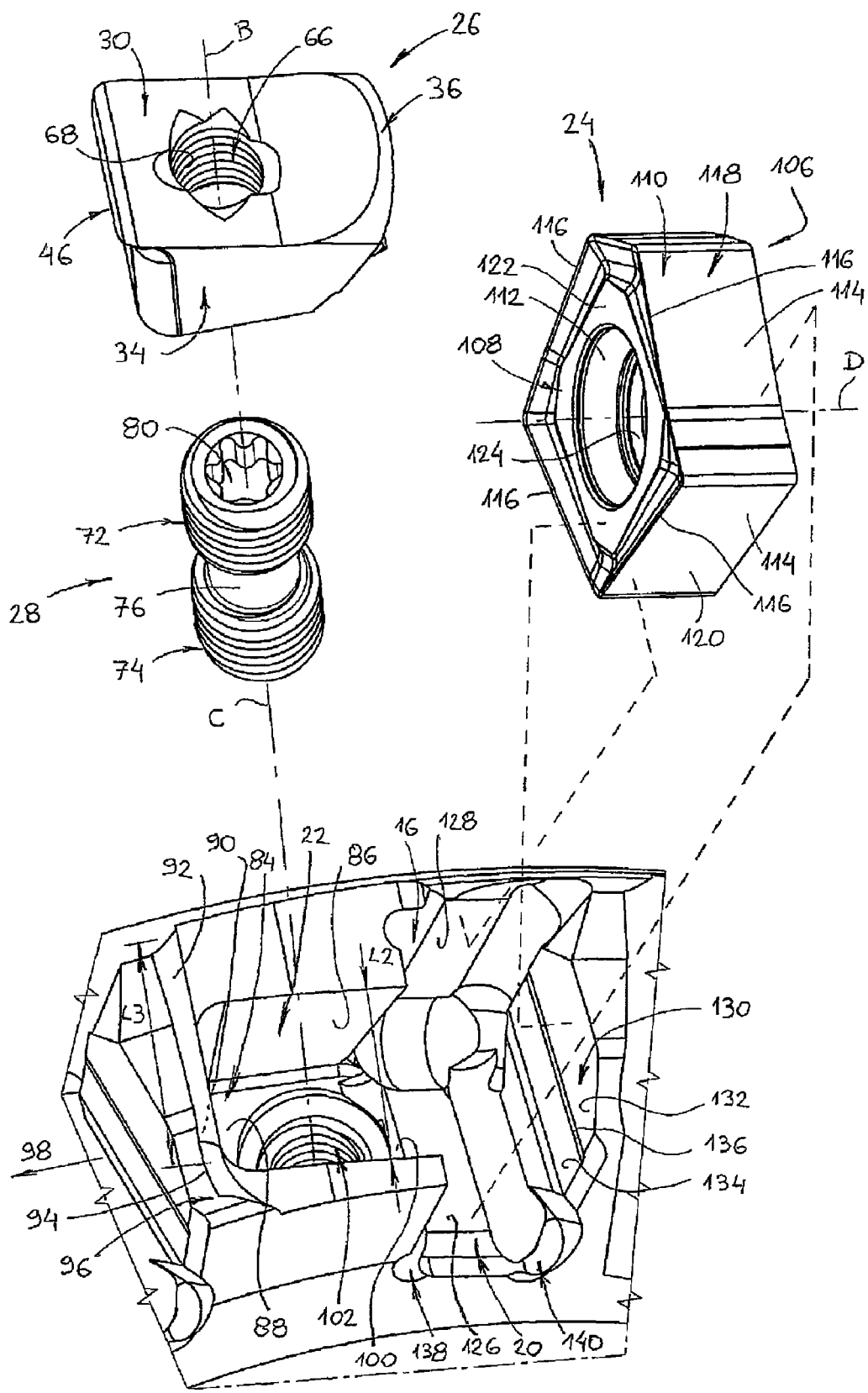
FIG. 14 is an enlarged exploded perspective view of the clamping mechanism of FIG. 1.

In FIGS. 1 and 14, one of the clamping mechanisms 12 and its associated cutting insert 24 are shown removed from their associated tool pocket 16, namely, the cutting insert 24 is shown removed from its insert pocket 20, and, the clamping arm 26 and clamping screw 28 are shown removed from their clamping arm pocket 22. As best seen in FIG. 14, the cutting insert pocket 20 is merged with its associated clamping arm pocket 22 to form the tool pocket 16.

Attention is now drawn to FIGS. 4 to 15. As shown, the clamping arm 26 comprises a clamp upper surface 30, a clamp lower surface 32, opposite the clamp upper surface 30, and two clamp side walls 34 that extend between the clamp upper surface 30 and the clamp lower surface 32. According to one embodiment, the two clamp side walls 34 are planar, parallel to each other and distanced a first distance L1 therebetween. Furthermore, the clamp lower surface 32 may be planar.

Figure 11:
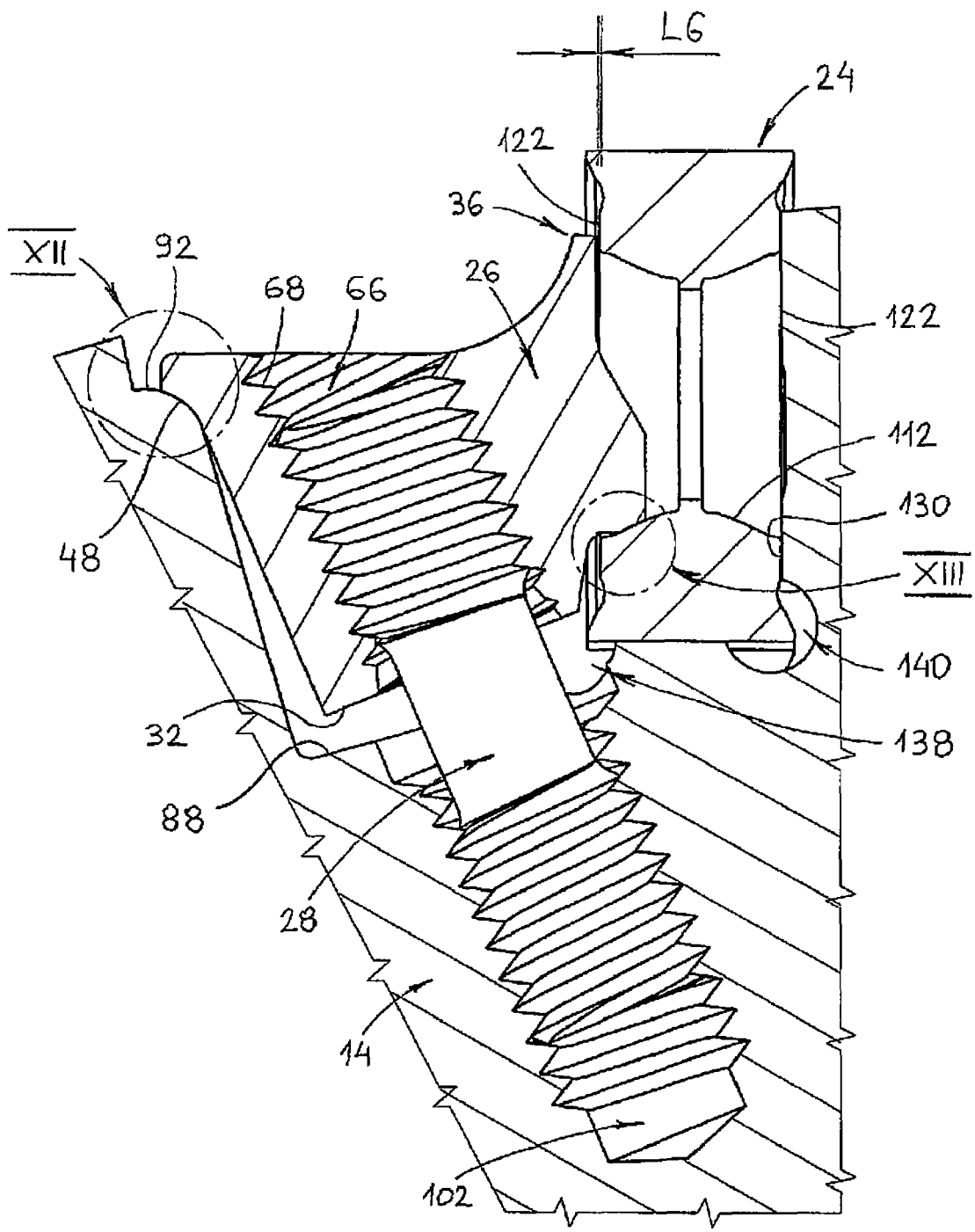
FIG. 11 shows the clamping mechanism of FIG. 10 in an assembled position.
Figure 15:
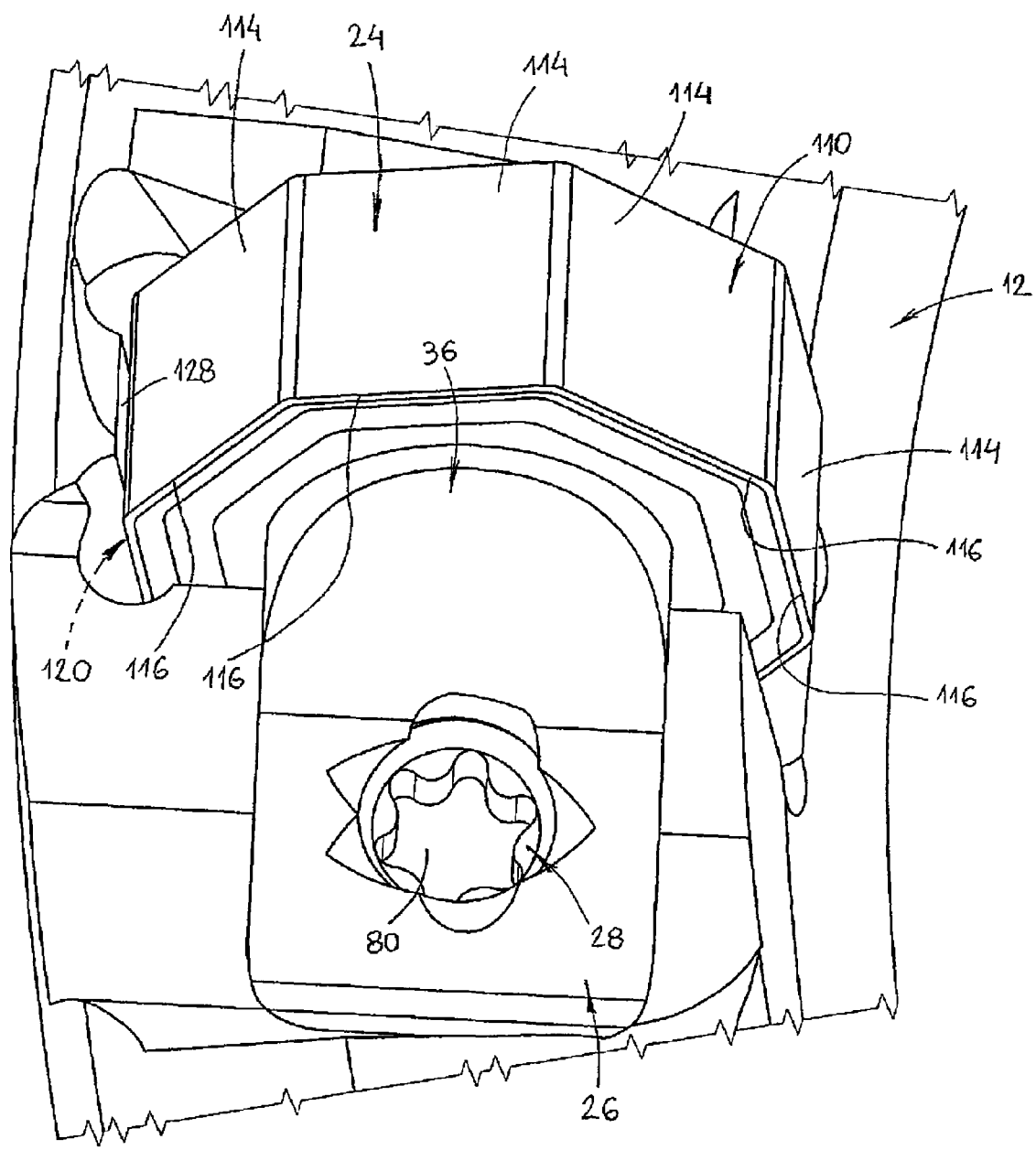
FIG. 15 is a perspective view of the clamping mechanism of FIG. 14 shown in an assembled position.

As seen in FIGS. 4 to 7, the clamp upper surface 30 is concave in a side view of the clamping arm 26 thus enabling free chip flow thereon during a metal cutting operation. In some embodiments, as best seen in FIGS. 11 and 15, a rear end 36 of the clamp upper surface 30 is convex as seen in a front to rear direction 38 of the clamping arm 26 (see FIG. 4), for a purpose that will be later described.

The clamping arm 26 further comprises, in a front portion 40 thereof, a clamp front surface 42 that extends between the clamp upper surface 30, the clamp lower surface 32 and the two clamp side walls 34. The clamp front surface 42 comprises a clamp front wall 44 that merges with the clamp upper surface 30 through a forwardly extending sliding protrusion 46.

Figure 7:
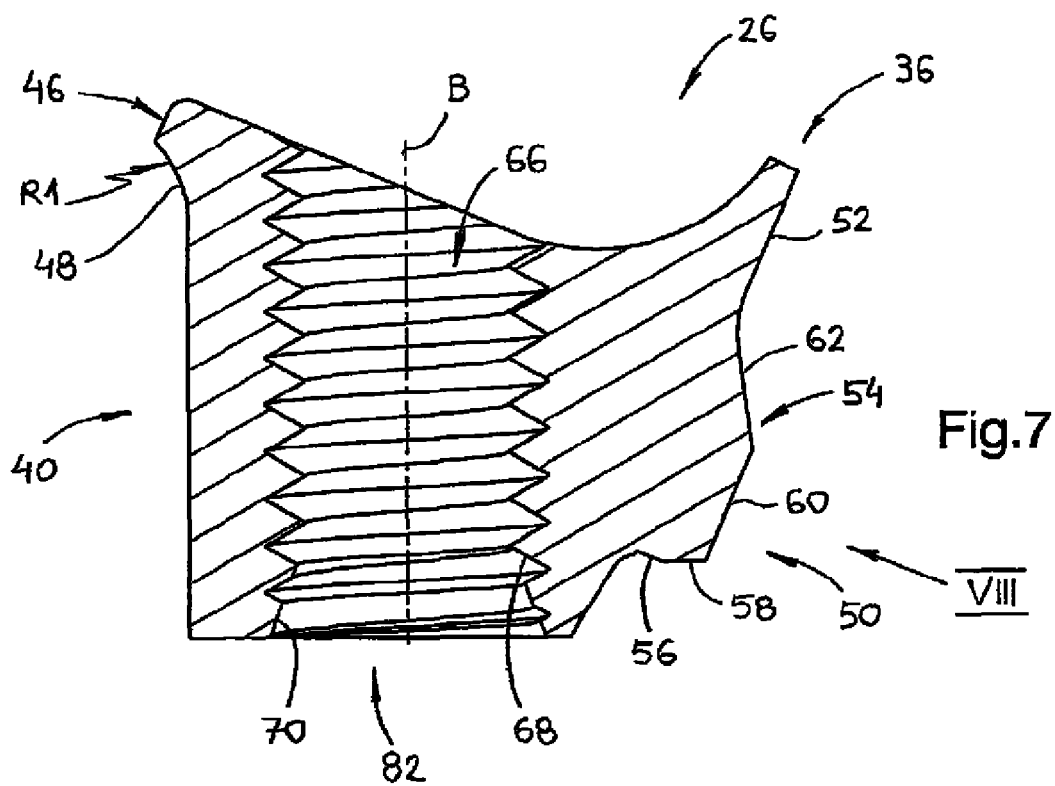
FIG. 7 is a cross-sectional view taken along line VII-VII in FIG. 8.
Figure 8:
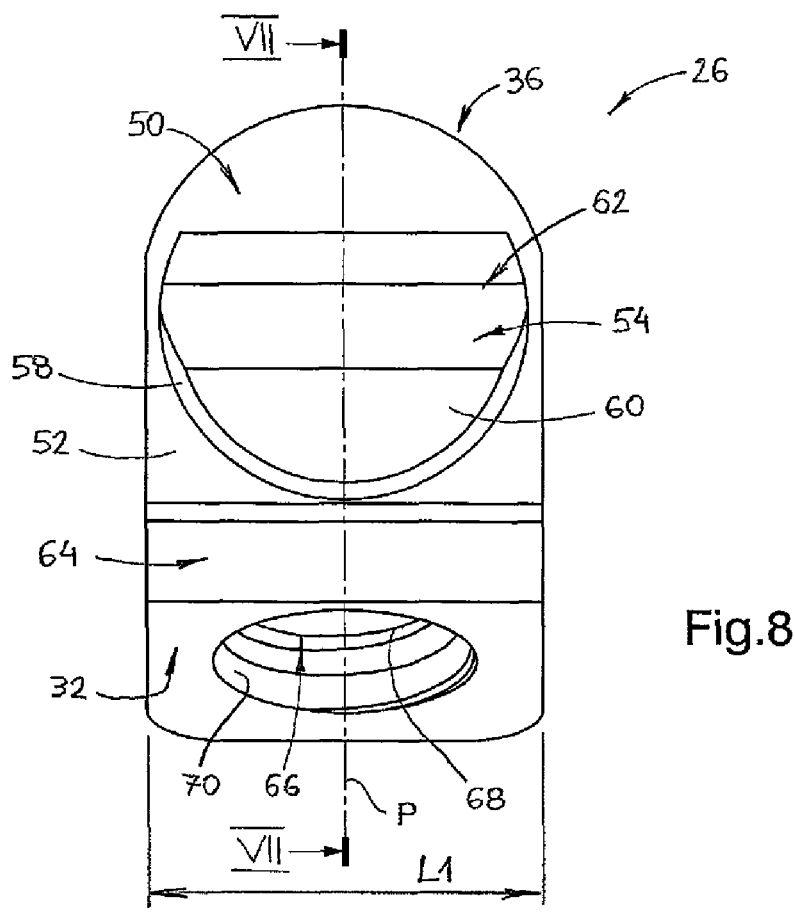
FIG. 8 is a rear view of the clamping arm of FIG. 1 as seen from the direction VIII in FIG. 7.
Figure 9:
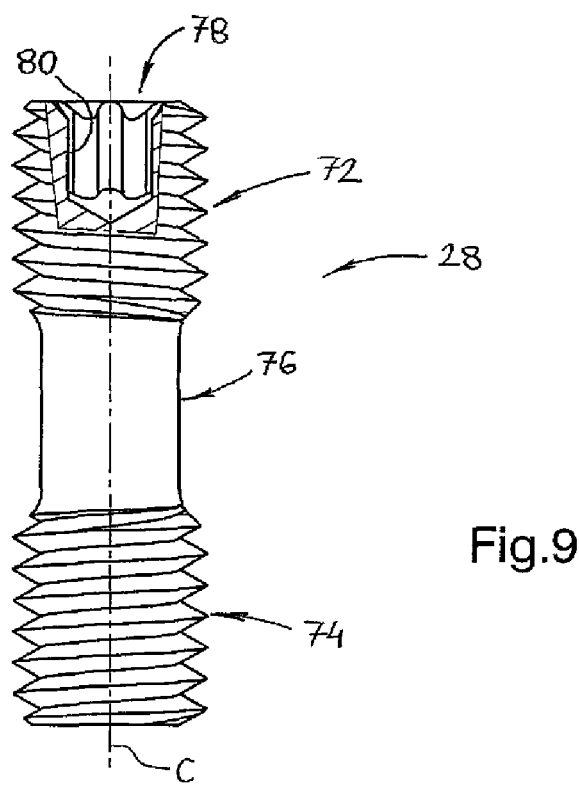
FIG. 9 is a side view of the clamping screw of FIG. 1.

As best seen in FIG. 7, the sliding protrusion 46 has a sliding concave surface 48 in a front lower portion thereof. The sliding concave surface 48 has a first radius of curvature R1 and it smoothly merges with the clamp front wall 44. According to one embodiment, the clamp front wall 44 is planar.

The clamping arm 26 comprises a clamp rear surface 50 that is opposite the clamp front surface 42. The clamp rear surface 50 comprises a clamp rear wall 52 and a clamping protrusion 54 extending rearwardly from the clamp rear wall 52. In one embodiment, the clamping protrusion 54 comprises a cylindrical portion 56 that merges with the clamp rear wall 52 and a slanted portion 58 that extends rearwardly from the cylindrical portion 56. A rear end of the slanted portion 58 merges with a protrusion back wall 60. The clamping protrusion 54 further comprises a cut-away portion 62 that merges, in an upper portion thereof, with the clamp rear wall 52, and, in a rearmost portion thereof, with the protrusion back wall 60.

According to one embodiment, the slanted portion 58 is conical. However, according to other embodiments, the slanted portion 58 may be slanted in other manners. Furthermore, the clamping protrusion 54 does not have to comprise a cylindrical portion 56, and the slanted portion 58 may extend rearwardly directly from the clamp rear wall 52.

In some embodiments, the clamp rear surface 50 may comprise, in a lower portion thereof, a transversely extending recess 64 for providing the clamp rear surface 50 sufficient clearance when clamping different types of cutting inserts by the same clamping arm 26.

According to one embodiment, the clamping arm 26 is symmetrical with respect to a symmetry plane P that bisects the clamping arm 26 between the two clamp side walls 34 and parallel thereto.

A threaded through bore 66 extends between the clamp upper surface 30 and the clamp lower surface 32. The threaded through bore 66 is symmetrical with respect to a through bore axis B. The through bore axis B lies on the symmetry plane P and may be parallel to the clamp front wall 44.

A thread 68 extends along the threaded through bore 66. In order to enable right-hand tightening of the clamping screw 28, i.e., tightening of the clamping screw 28 in a clockwise direction, the thread 68 is left-handed. It is understood that if a left-hand tightening of the clamping screw 28 is required, i.e., tightening of the clamping screw 28 in an anticlockwise direction, then, the thread 68 is right-handed.

The thread 68 may extend between the clamp lower surface 32 and the clamp upper surface 30. However, it is not necessary that the thread 68 extends up to the clamp upper surface 30, and it may extend only along a portion of the threaded through bore 66. Furthermore, the threaded through bore 66 may be only partially threaded such that the engagement of the clamping screw 28 with the thread 68 is limited to a given length in order to limit the insertion of the clamping screw 28 into the clamping arm 26 (not shown in the figures).

In some embodiments, the threaded through bore 66 is provided with a widening 70 in a lower portion thereof in order to facilitate easier first engagement between the clamping screw 28 and the thread 68 of the threaded through bore 66.

The clamping screw 28 has a clamping screw axis C and comprises a screw upper threaded portion 72, a screw lower threaded portion 74, and an unthreaded screw neck portion 76 therebetween. The screw upper threaded portion 72 and the screw lower threaded portion 74 are threaded in opposite directions. According to one embodiment, the screw upper threaded portion 72 is a left-hand thread and the screw lower threaded portion 74 is a right-hand thread.

An end portion 78 of the screw upper threaded portion 72 is provided with a key slot 80 for insertion of a suitable key (not shown) for rotating the clamping screw 28. The key slot 80 may be formed for receiving a Torx key, an Allen key, or any other suitable key.

Attention is now drawn to FIGS. 10 to 15 for describing the assembly of the clamping mechanism 12.

At a first stage, the screw upper threaded portion 72 is threadingly engaged, a few turns only, into a lower portion 82 of the threaded through bore 66 of the clamping arm 26. This stage ensures primary engagement between the clamping arm 26 and the clamping screw 28.

At a second stage, the clamping screw 28 together with the clamping arm 26 are inserted into the clamping arm pocket 22 in a leading portion 84 of the tool pocket 16.

The clamping arm pocket 22 is bounded by two pocket side walls 86 that are opposite each other. According to one embodiment, the pocket side walls 86 are planar, parallel to each other, and distanced a second distance L2 therebetween. For practical reasons, the second distance L2 is similar to the first distance L1 and slightly larger therefrom. A pocket base wall 88 extends between the pocket side walls 86.

The two pocket side walls 86 merge, at a forward portion thereof, with a pocket front wall 90 that may be planar. An upper end of the pocket front wall 90 forms a sliding convex surface 92 that is directed upwardly and rearwardly and has a second radius of curvature R2.

The second radius of curvature R2 is similar to the first radius of curvature R1. The second radius of curvature R2 may be larger, equal, or smaller than the first radius of curvature R1. According to one embodiment, the second radius of curvature R2 is slightly smaller than the first radius of curvature R1 in order to create a single line contact between the sliding concave surface 48 of the clamping arm 26 and the sliding convex surface 92 of the clamping arm pocket 22. A single line contact may enable rolling of the clamping arm 26 on the sliding convex surface 92 of the clamping arm pocket 22 as well as easy sliding therebetween. The sliding convex surface 92 may have a lateral dimension of a third length L3 that is similar to the second distance L2 between the pocket side walls 86. In some embodiments, the third length L3 may be larger that the second distance L2.

The sliding convex surface 92 may end, in a transverse end 94 thereof, with a tool body widening 96. The tool body widening 96 serves two purposes. First, it provides additional side support strengthening to the clamping arm pocket 22. Second, it strengthens the tangential support of the tool body 14 for the cutting insert 224 (see FIG. 1) that is retained tangentially forwardly, in the tangentially forwardly direction 98, and adjacent the leading portion 84 of the tool pocket 16.

The clamping arm pocket 22 is provided, in a lower portion 100 thereof, with a pocket threaded bore 102 having a thread 104. The thread 104 matches in size and direction to the screw lower threaded portion 74.

Now, the clamping screw 28 is threadingly engaged a few turns into the pocket threaded bore 102. This is done by means of a suitable key (not shown) that is engaged, through the threaded through bore 66 of the clamping arm 26, and within the key slot 80. At this stage, the clamping mechanism 12 is engaged with the tool body 14 and in a position ready for receiving a cutting insert 24 into the insert pocket 20.

The cutting insert 24 is of a type suitable for being retained by the clamping mechanism 12 according to the present invention. Typically, the cutting insert is double-sided. However, a single sided cutting insert, as well, may be retained by the clamping mechanism 12.

The cutting insert 24 is of a generally prismatic shape and comprises an insert front surface 106, an insert rear surface 108, opposite the insert front surface 106, and an insert peripheral surface 110 therebetween. An insert through bore 112, having an insert through bore axis D, extends between the insert front surface 106 and the insert rear surface 108.

The insert peripheral surface 110 is divided into insert side faces 114. In the embodiment shown in FIG. 15, the insert peripheral surface 110 is divided into eight identical insert side faces 114 for being eight times indexed with respect to the insert through bore axis D. In other embodiments (like shown, for example, in FIG. 14), the cutting insert may be generally square. In which case, the insert peripheral surface 110 will be divided into four identical insert side faces 114 for being four times indexed with respect to the insert through bore axis D.

The cutting inserts shown in FIGS. 14 and 15 are also reversible. That means that after they were indexed with respect to the through bore axis D, they may be turned over, thus replacing places between the insert front surface 106 and the insert rear surface 108. In this position, they may be indexed again with respect to the through bore axis D; four times for the cutting insert shown in FIG. 14 and eight times for the cutting insert shown in FIG. 15.

The two cutting inserts 24 shown in FIGS. 14 and 15 have, respectively, four and eight insert side faces 114. Advantageously, each of the cutting inserts can be retained within the same insert pocket 20, and clamped by the clamping mechanism 12 of the present invention. However, it is understood that other shapes of cutting inserts, having different number of insert side faces, for example, six, may be equally retained by the clamping mechanism of the present invention. In which case, a slight modification of the insert pocket may be required.

The intersection between the insert front and rear surfaces 106, 108 and the insert side faces 114 constitutes cutting edges 116 of the cutting insert 24. In the embodiment shown in FIG. 14, the cutting insert 24 is provided with four insert side faces and eight cutting edges 116. In which case, four cutting edges 116 are associated with the insert front surface 106 and four cutting edges 116 are associated with the insert rear surface 108.

In the embodiment shown in FIG. 15, the cutting insert 24 is provided with eight insert side faces and sixteen cutting edges 116. In which case, eight cutting edges 116 are associated with the insert front surface 106 and eight cutting edges 116 are associated with the insert rear surface 108. In other embodiments, the cutting insert may be provided with a different number of cutting edges.

In FIG. 14, the orientation of the cutting insert 24 corresponds to the orientation of the insert pocket 20. However, for sake of clarity, since the cutting insert 24 has identical insert front and rear surfaces 106, 108, and four identical insert side faces 114, and since the active abutment surfaces of the cutting insert 24 are not visible in this view, the direction of the abutment surfaces was inversed, and the three dashed lines connecting between the cutting insert 24 and the insert pocket 20 show the abutted position of the abutment surfaces of the cutting insert against the respective abutment surfaces of the insert pocket 20.

In the embodiment shown, a first insert side face 114 serves as an insert axial abutment surface 118, and a second insert side face 114 serves as an insert radial abutment surface 120. The insert rear surface 108 is provided with an insert tangential abutment surface 122 that extends around the insert through bore 112. A lower front portion of the insert through bore 112 serves as an insert retaining surface 124.

The insert pocket 20 comprises a pocket axial abutment surface 126, adjacent the pocket threaded bore 102, a pocket radial abutment surface 128, radially outward from the pocket axial abutment surface 126 and generally perpendicular thereto, and, a pocket tangential abutment surface 130, rearward of the pocket axial and radial abutment surfaces 126, 128 and generally perpendicular thereto.

In one embodiment, the pocket tangential abutment surface 130 comprises an upper pocket tangential abutment portion 132 that is coplanar with a lower pocket tangential abutment portion 134, and separated therefrom by a pocket tangential relief recess 136. Such a construction enables a better uniform tangential support to the cutting insert 24.

In the same manner, if desired, the pocket axial abutment surface 126 may be comprised from two pocket axial abutment portions that are separated by a pocket axial relief recess (not shown). Similarly, if desired, the pocket radial abutment surface 128 may be comprised from two pocket radial abutment portions that are separated by a pocket radial relief recess (not shown).

The construction of the pocket abutment surfaces is not limited to the described above, and other constructions of the pocket abutment surfaces may be needed, depending on the construction of the various surfaces of the cutting insert that need to be abutted.

At a third stage, the cutting insert 24 is placed within the insert pocket 20 such that the insert axial abutment surface 118 abuts the pocket axial abutment surface 126, the insert radial abutment surface 120 abuts the pocket radial abutment surface 128, and, the insert tangential abutment surface 122 abuts the pocket tangential abutment surface 130.

Figure 10:
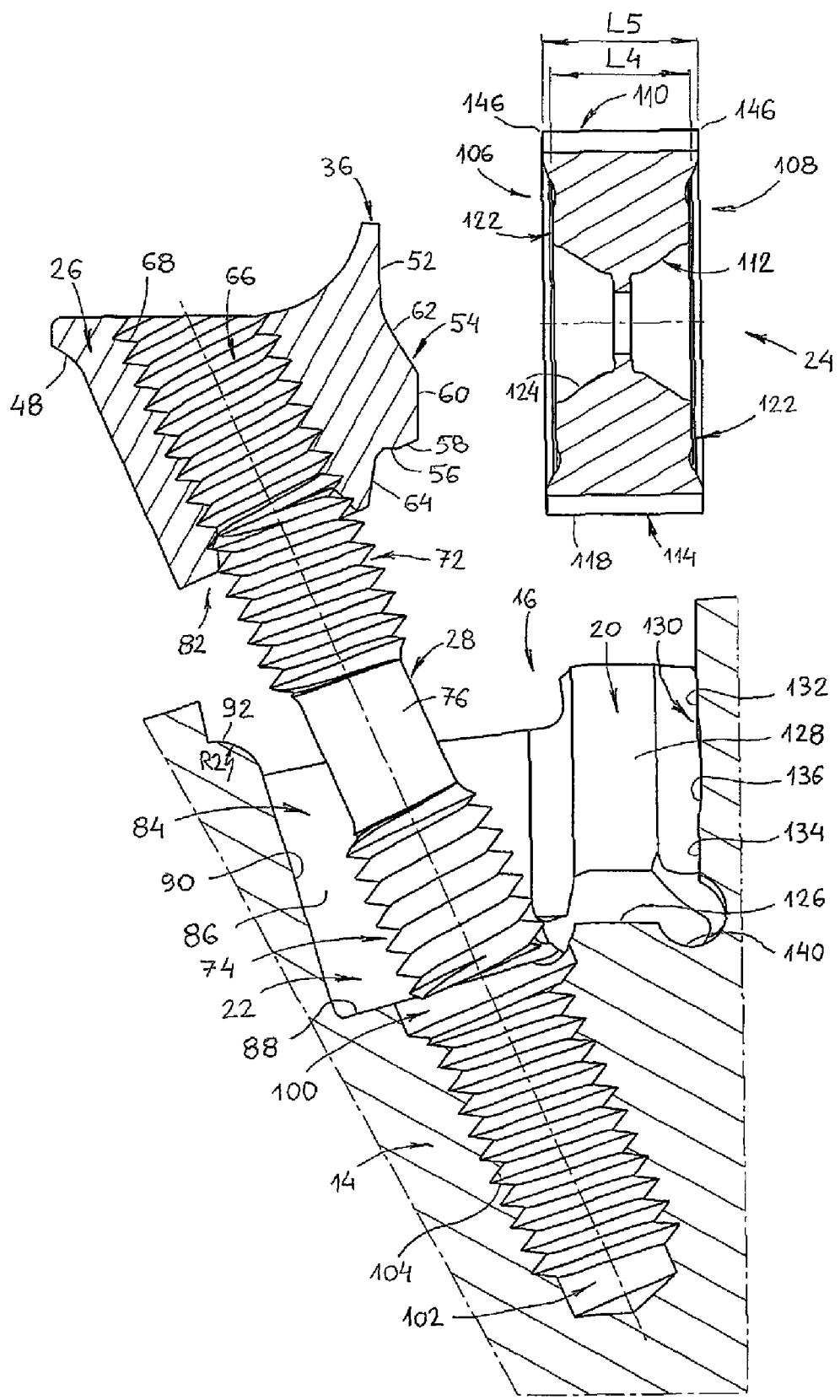
FIG. 10 is an exploded cross-sectional view of a clamping mechanism and a cutting insert of FIG. 1 taken along a symmetry plane of the clamping arm.

In the embodiments shown, the insert tangential abutment surfaces 122 are inwardly located, i.e., recessed, with respect to extreme points 146 of the insert front and rear surfaces 106, 108. Namely, as shown in FIG. 10, a fourth distance L4 between the insert tangential abutment surfaces 122 is shorter than a fifth distance L5 between the extreme points 146 of the insert front and rear surfaces 106, 108, as seen in a side view of the cutting insert 24.

Therefore, the insert pocket 20 is provided with a pocket front relief recess 138 and a pocket rear relief recess 140 in order to provide adequate relief to the cutting edges 116 of the cutting insert 24 when it is retained within the insert pocket 20. The pocket front relief recess 138 is located forward to the pocket axial and radial abutment surfaces 126, 128. The pocket rear relief recess 140 is located rearward to the pocket axial and radial abutment surfaces 126, 128.

At a fourth stage, the clamping screw 28 is rotated in a closing direction until the sliding concave surface 48 of the clamping arm 26 comes in contact with the sliding convex surface 92 of the clamping arm pocket 22. During that stage, the clamping protrusion 54 of the clamping arm 26 protrudes into the insert through bore 112 thus preventing the cutting insert from falling out of the insert pocket 20. In this stage, rotation of the clamping screw 28 in the closing direction causes the clamping screw 28 to travel deeper into pocket threaded bore 102 and also causes the clamping arm 26 to travel deeper into the clamping arm pocket 22.

Figure 12:
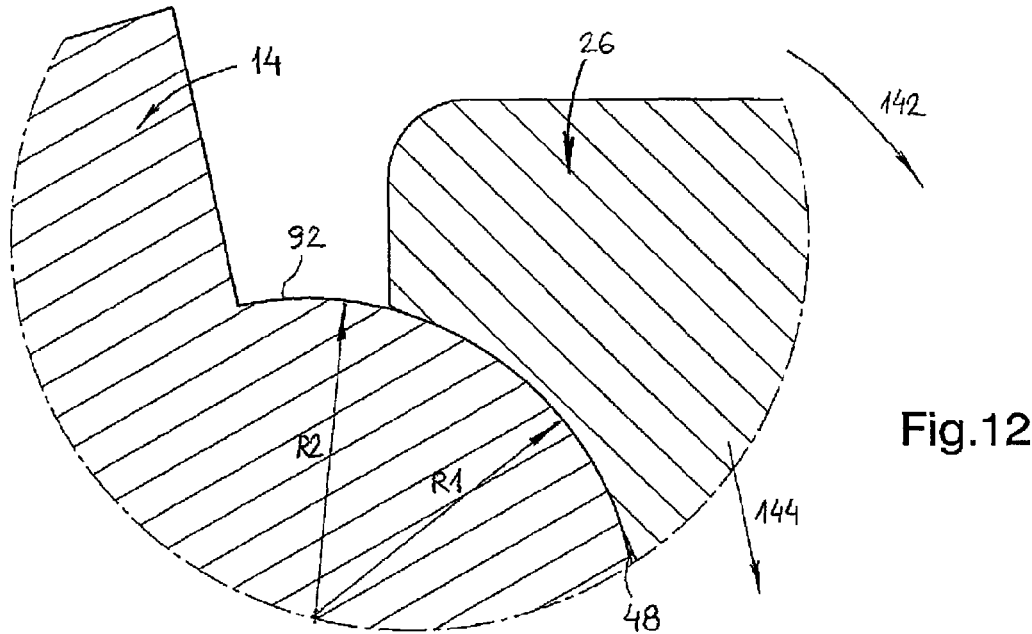
FIG. 12 is an enlarged view of the encircled portion XII in FIG. 11.
Figure 13:
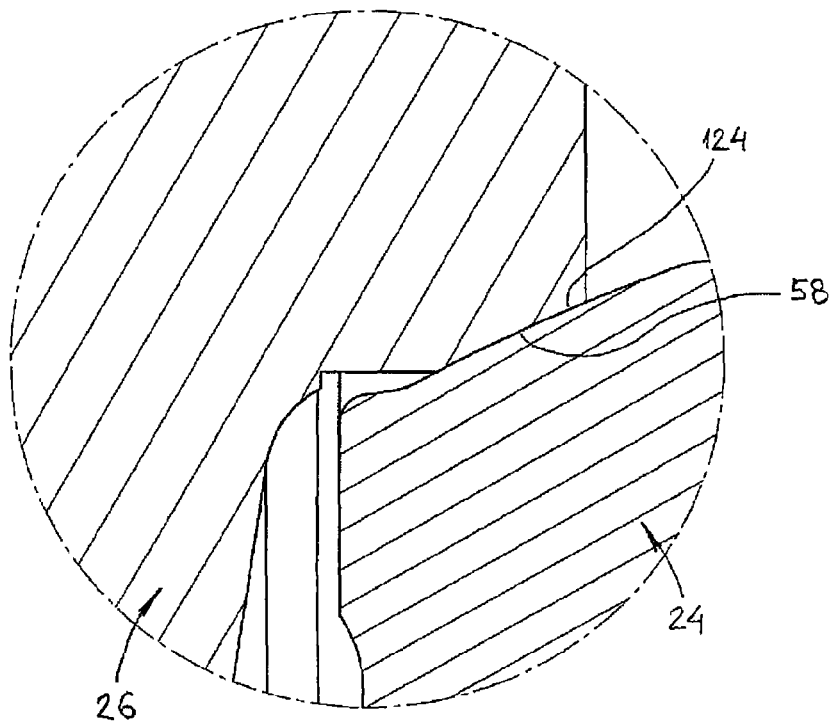
FIG. 13 is an enlarged view of the encircled portion XIII in FIG. 11.

Upon further tightening of the clamping screw 28, the clamping arm 26 moves in a combined rotational and translational movement. The first movement of the clamping arm 26 is a rotational movement around the sliding convex surface 92 of the clamping arm pocket 22 in a clamping arm rotational direction 142, as shown in FIG. 12. The second movement of the clamping arm 26 is a translational movement in a clamping arm translational direction 144, towards the pocket threaded bore 102.

The combined movement causes the slanted portion 58 of the clamping protrusion 54 to press against the insert retaining surface 124 of the insert through bore 112. The press is in a direction that causes and maintains a firm abutment between the cutting insert 24 and the insert pocket 20, namely, against the pocket axial 126, radial 128, and tangential 130 abutment surfaces.

The combined movement of the clamping arm 26 is limited to be in a plane parallel to the symmetry plane P and parallel to the pocket side walls 86. This is carried out by providing tight tolerances between the first distance L1 between the clamp side walls 34 and the second distance L2 between the pocket side walls 86. Thus, the clamping arm 26 is prevented from movement in a direction that is not parallel to the pocket side walls 86. Such a restriction of the movement of the clamping arm 26 guarantees the exact and univocal positioning of the slanted portion 58 of the clamping protrusion 54 against the insert retaining surface 124.

Thus, in the process described above, a cutting tool assembly comprising the tool body 14, the clamping arm 26, the clamping screw 28 and the cutting insert 24 can be adjusted from an unassembled state in which these four components are separated from one another to an assembled state in which the clamping arm 26 is retained in the clamping arm pocket 22 by the clamping screw 28 with the cutting insert 24 being retained in the insert pocket 20 with the clamping protrusion 54 of the clamping arm 26 pressing against the insert retaining surface 124 of the cutting insert 24, thereby retaining the cutting insert in the tool pocket 16.

The press of the slanted portion 58 against the insert retaining surface 124 is similar to the retaining of a common retaining screw as known in the art against a same kind of insert retaining surface 124. The saying that the retaining is similar means that no special design of the insert through bore 112 is required, and a common cutting insert may be used with the cutting tool 10 according to the present invention, wherein the same cutting insert 24 may be retained by a common retaining screw in other types of tools.

In this manner, a firm and efficient clamping of the cutting insert 24 is obtained. Furthermore, the construction of the clamping screw 28 such that the screw upper threaded portion 72 and the screw lower threaded portion 74 are threaded in opposite directions, provides axial pulling of the clamping arm 26 towards the pocket threaded bore 102. By such pulling, the clamping arm 26 is actually wedged between the sliding convex surface 92 and the cutting insert 24, and, therefore, causes a larger clamping force against the cutting insert 24.

As explained above, the rear end 36 of the clamp upper surface 30 is convex as seen in a front to rear direction 38 of the clamping arm 26. This construction of the clamping arm 26 provides sealing of the insert through bore 112 against penetration of chips produced during machining, and prevents chips from being stuck between the clamping arm 26 and the cutting insert 24.

As best seen in FIG. 11, the rear end 36 of the clamp upper surface 30 is opposite an insert tangential abutment surface 122, and may be slightly separated therefrom a sixth distance L6 in order to assure that the contact between the clamping arm 26 and the cutting insert 24 will first take place between the slanted portion 58 of the clamping protrusion 54 and the insert retaining surface 124 of the insert through bore 112. Also, as seen in FIGS. 11 and 14, even though the cutting insert 24 may have a through bore 112 suitable for accommodating a clamping screw, in the present invention, the cutting insert's through bore 112 is unoccupied by a clamping screw which passes entirely therethrough to secure the cutting insert to a clamping bore formed in the insert pocket.

Thus, in a cutting tool 10 according to the present invention, an extra-fine pitch milling cutter is obtained, having a relatively small pitch angle α (see FIG. 2). In one embodiment, a cutting tool of a 125 mm diameter may have an angle α equal to 18° and retain twenty cutting inserts 24 which is a large number comparing with similar cutting tools known in the art.

Although the present invention has been described to a certain degree of particularity, it should be understood that various alterations and modifications could be made without departing from the spirit or scope of the invention as hereinafter claimed.

Even though the cutting insert, that was described to be clamped by the clamping mechanism according to the present invention, has a through bore, it should be understood that the cutting insert does not have to be provided with a through bore. In such a case, when the cutting insert is not provided with a through bore, it is provided with a bore or indentation configured such that it has an insert retaining surface to be pressed by the clamping protrusion.

What is claimed is:

1. In combination, a clamping arm (26) and a reversible cutting insert (24) in a tool body (14),
   the clamping arm (26) seated within a clamping arm pocket (22), the clamping arm (26) comprising a clamping protrusion (54) extending rearwardly from a rear surface (50) of the clamping arm;
   the reversible cutting insert (24) having front and rear surfaces (106, 108) each comprising a bore (112) having an insert retaining surface (124), the cutting insert being seated within an insert pocket (20); wherein:
   the clamping protrusion (54) is configured to press against the insert retaining surface (124) of one of the front and rear surfaces (106, 108) to securely retain the cutting insert (24) within the insert pocket (20), upon tightening the clamping arm (26) into the tool body (14).

2. The combination according to claim 1, wherein:
   upon tightening the clamping arm (26) into the tool body (14), the clamping arm moves in a combined rotational (142) and translational (144) movement.

3. The combination according to claim 1, wherein:
   the bore of the cutting insert (24) is a through bore (112).

4. The combination according to claim 1, wherein:
   the clamping protrusion (54) comprises a cylindrical portion (56) merging with a clamp rear wall (52) and a slanted portion (58) extending rearwardly from the cylindrical portion.

5. The combination according to claim 4, wherein:
   the slanted portion (58) is conical.

6. The combination according to claim 1, wherein:
   the rear surface (50) of the clamping arm (26) is provided with a transversely extending recess (64) in a lower portion thereof.

7. The combination according to claim 1, wherein:
   the tool body (14) comprises a pocket threaded bore (102) extending inwardly to the tool body, the pocket threaded bore having a pocket thread (104) directed in a first direction;
   the clamping arm (26) comprises a clamp upper surface (30) and a clamp lower surface (32) extending between two clamp side walls (34), a threaded through bore (66) extending from the clamp upper surface to the clamp lower surface, the threaded through bore having a through bore thread (68) directed in a second direction, the second direction being opposite to the first direction;
   a clamping screw (28) retains the clamping arm (26) in the clamping arm pocket (22), the clamping screw having a screw upper threaded portion (72), a screw lower threaded portion (74) and an unthreaded screw neck portion (76) therebetween, the screw lower threaded portion having a thread directed in the first direction and threadingly engaged with the pocket threaded bore of the tool body, the screw upper threaded portion having a thread directed in the second direction and threadingly engaged with the threaded through bore of the clamping arm; and upon turning the clamping screw in the first direction, the clamping arm is pulled into the clamping arm pocket towards the pocket threaded bore, and the clamping protrusion of the clamping arm presses against the insert retaining surface thus securely abutting the cutting insert within the insert pocket.

8. The combination according to claim 7, wherein:
the clamp upper surface (30) being concave in a side view of the clamping arm (26).

9. The combination according to claim 7, wherein:
the clamping screw (28) comprises a key slot (80) in an end portion (78) thereof.

10. The combination according to claim 7, wherein:
a rear end (36) of the clamp upper surface (30) being convex in a front to rear direction (38) of the clamping arm.

11. The combination according to claim 10, wherein:
in a clamped position of the cutting insert (24), the rear end (36) of the clamp upper surface (30) covers the bore (112) of the cutting insert.

12. The combination according to claim 11, wherein:
the rear end (36) of the clamp upper surface (30) is distanced a sixth distance (L6) from a tangential abutment surface (122) of the cutting insert (24).

13. In combination, a clamping arm (26) and a cutting insert (24) in a tool body (14),
the clamping arm (26) seated within a clamping arm pocket (22), the clamping arm (26) comprising a clamping protrusion (54) extending rearwardly from a rear surface (50) of the clamping arm;
the cutting insert (24) comprising a bore (112) having an insert retaining surface (124), the cutting insert being seated within an insert pocket (20); wherein:
the clamping protrusion (54) is configured to press against the insert retaining surface (124) to securely retain the cutting insert (24) within the insert pocket (20), upon tightening the clamping arm (26) into the tool body (14);
the tool body (14) comprises a pocket threaded bore (102) extending inwardly to the tool body, the pocket threaded bore having a pocket thread (104) directed in a first direction;
the clamping arm (26) comprises a clamp upper surface (30) and a clamp lower surface (32) extending between two clamp side walls (34), a threaded through bore (66) extending from the clamp upper surface to the clamp lower surface, the threaded through bore having a through bore thread (68) directed in a second direction, the second direction being opposite to the first direction;
a clamping screw (28) retains the clamping arm (26) in the clamping arm pocket (22), the clamping screw having a screw upper threaded portion (72), a screw lower threaded portion (74) and an unthreaded screw neck portion (76) therebetween, the screw lower threaded portion having a thread directed in the first direction and threadingly engaged with the pocket threaded bore of the tool body, the screw upper threaded portion having a thread directed in the second direction and threadingly engaged with the threaded through bore of the clamping arm;
upon turning the clamping screw in the first direction, the clamping arm is pulled into the clamping arm pocket towards the pocket threaded bore, and the clamping protrusion of the clamping arm presses against the insert retaining surface thus securely abutting the cutting insert within the insert pocket;
the clamping arm (26) comprises in a front portion (40) thereof a clamp front surface (42) that extends between the clamp upper surface (30), the clamp lower surface (32) and the two clamp side walls (32),
the clamp front surface (42) comprises a clamp front wall (44) that merges with the clamp upper surface (30) through a forwardly extending sliding protrusion (46),
the sliding protrusion comprises a sliding concave surface (48) in a front lower portion thereof, the sliding concave surface having a first radius of curvature (R1) and smoothly merges with the clamp front wall;
the clamping arm pocket (22) has two pocket side walls (86) extending rearwardly from a pocket front wall (90), an upper end of the pocket front wall having a sliding convex surface (92) that is directed upwardly and rearwardly and has a second radius of curvature (R2);
upon turning the clamping screw (28) in the first direction and creating a first contact between the sliding concave surface (48) of the clamping arm and the sliding convex surface (92) of the clamping arm pocket, the clamping arm (26) moves in a combined rotational (142) and translational (144) movement.

14. The combination according to claim 13, wherein:
the second radius of curvature (R2) is smaller than the first radius of curvature (R1).

15. The combination according to claim 13, wherein:
the rotational movement comprises rotation of the clamping arm (26) around the sliding convex surface (92) of the clamping arm pocket (22) in a clamping arm rotational direction (142); and
the translational movement (144) comprises translation of the clamping arm (26) towards the pocket threaded bore (102).

16. The combination according to claim 13, wherein:
the clamp side walls (34) are planar, parallel to each other and have a first distance (L1) therebetween;
the pocket side walls (86) are planar, parallel to each other and have a second distance (L2) therebetween; and
the first distance (L1) is slightly smaller than the second distance (L2).

17. The combination according to claim 13, wherein:
the sliding convex surface (92) ends, in a transverse end (94) thereof, with a tool body widening (96).

18. A cutting tool comprising:
a tool body (14) having formed therein at least one tool pocket (16) which comprises an insert pocket (20) merged with an associated clamping arm pocket (22), the clamping arm pocket having a pocket threaded bore (102);
a clamping arm (26) seated in the clamping arm pocket (22), the clamping arm comprising a clamp upper surface (30), a clamp lower surface (32), a clamp front surface (42), a clamp rear surface (50), a clamping protrusion (54) extending rearwardly from the clamp rear surface (50) and a threaded through bore (66) extending between the clamp upper surface and the clamp lower surface; and
a clamping screw (28) retaining the clamping arm in the clamping arm pocket, the clamping screw comprising a screw upper threaded portion (72) threadingly engaged to the threaded through bore (66) and a screw lower threaded portion (74) threadingly engaged to the pocket threaded bore (102), the screw upper threaded portion and the screw lower threaded portion are threaded in opposite directions; wherein:
the clamping arm is configured to move in a combined rotational (142) and translational (144) movement resulting from a sliding concave surface of the clamping arm sliding against a sliding convex surface of the tool body, upon rotation of the clamping screw in a first direction.

19. A cutting tool comprising:
a tool body (14) having formed therein at least one tool pocket (16) which comprises an insert pocket (20) merged with an associated clamping arm pocket (22), the clamping arm pocket having a pocket threaded bore (102);
a clamping arm (26) seated in the clamping arm pocket (22), the clamping arm comprising a clamp upper surface (30), a clamp lower surface (32), a clamp front surface (42), a clamp rear surface (50), a clamping protrusion (54) extending rearwardly from the clamp rear surface (50) and a threaded through bore (66) extending between the clamp upper surface and the clamp lower surface; and
a clamping screw (28) retaining the clamping arm in the clamping arm pocket, the clamping screw comprising a screw upper threaded portion (72) threadingly engaged to the threaded through bore (66) and a screw lower threaded portion (74) threadingly engaged to the pocket threaded bore (102), the screw upper threaded portion and the screw lower threaded portion are threaded in opposite directions; wherein:
the clamping arm is configured to move in a combined rotational (142) and translational (144) movement, upon rotation of the clamping screw in a first direction;
the clamp front surface (42) comprises a clamp front wall (44) that merges with the clamp upper surface (30) through a forwardly extending sliding protrusion (46);
the sliding protrusion comprises a sliding concave surface (48) in a front lower portion thereof, the sliding concave surface having a first radius of curvature (R1);
the clamping arm pocket (22) has a pocket front wall (90), an upper end of the pocket front wall having a sliding convex surface (92), the sliding convex surface having a second radius of curvature (R2); and
the sliding concave surface abuts the sliding convex surface.

20. A cutting tool assembly comprising:
a tool body (14) having formed therein at least one tool pocket (16) which comprises an insert pocket (20) merged with an associated clamping arm pocket (22), the clamping arm pocket having a pocket threaded bore (102);
a clamping arm (26) comprising a clamp upper surface (30), a clamp lower surface (32), a clamp front surface (42), a clamp rear surface (50), a clamping protrusion (54) extending rearwardly from the clamp rear surface (50) and a threaded through bore (66) extending between the clamp upper surface and the clamp lower surface;
a clamping screw (28) comprising a screw upper threaded portion (72) threadingly engageable to the threaded through bore (66) and a screw lower threaded portion (74) threadingly engageable to the pocket threaded bore (102), the screw upper threaded portion and the screw lower threaded portion are threaded in opposite directions; and
a cutting insert (24) comprising a bore (112) having an insert retaining surface (124); wherein:
the cutting tool assembly is adjustable between:
an unassembled state in which the tool body, clamping arm, clamping screw and cutting insert are separated from one another; and
an assembled state in which:
the clamping arm is retained in the clamping arm pocket by the clamping screw; and
the cutting insert is located in the insert pocket with the clamping protrusion of the clamping arm pressing against the cutting insert's insert retaining surface; and
the clamping arm is configured to move in a combined rotational (142) and translational (144) movement resulting from a sliding concave surface of the clamping arm sliding against a sliding convex surface of the tool body, upon rotation of the clamping screw in a first direction.

21. A cutting tool comprising:
a tool body (14) having formed therein at least one tool pocket (16) which comprises an insert pocket (20) merged with an associated clamping arm pocket (22), the clamping arm pocket (22) having a pocket threaded bore (102) and a pocket front wall (90) provided with a sliding convex surface (92); and
a clamping arm (26) seated within a clamping arm pocket (22), the clamping arm (26) comprising a clamp upper surface (30), a clamp lower surface (32), a clamp rear surface (50) having a clamping protrusion (54) extending rearwardly therefrom, and a clamp front surface (42) provided with a sliding concave surface (48); wherein:
upon tightening the clamping arm (26) into the tool body (14), the clamping arm moves in a combined rotational (142) and translational (144) movement resulting from the sliding concave surface (48) of the clamping arm (22) sliding against the sliding convex surface (92) of the clamping arm pocket (22).

22. The cutting tool according to claim 21, further comprising:
a cutting insert (24) seated within the insert pocket (20), the cutting insert comprising a bore (112) having an insert retaining surface (124); wherein:
the clamping protrusion (54) is configured to press against the insert retaining surface (124) to securely retain the cutting insert (24) within the insert pocket (20), upon tightening the clamping arm (26) into the tool body (14); and
the bore of the cutting insert (24) is a through bore (112).

* * * * *